United States Patent [19]

Augustin

[11] Patent Number: 5,454,644
[45] Date of Patent: Oct. 3, 1995

[54] FOLDABLE OBJECT SUCH AS INFORMATION CARRIER, CONTAINER AND THE LIKE

[76] Inventor: Andreas Augustin, Glasauergasse 36, A-1130 Vienna, Austria

[21] Appl. No.: 129,138

[22] PCT Filed: Feb. 13, 1992

[86] PCT No.: PCT/AT92/00019

§ 371 Date: Oct. 10, 1993

§ 102(e) Date: Oct. 10, 1993

[87] PCT Pub. No.: WO93/15916

PCT Pub. Date: Aug. 19, 1993

[51] Int. Cl.[6] ................................................ B65D 30/20
[52] U.S. Cl. .......................... 383/120; 150/150; 281/5; 383/4
[58] Field of Search .................... 150/150; 383/120, 383/4; 281/5

[56] References Cited

U.S. PATENT DOCUMENTS

| | | | |
|---|---|---|---|
| 2,525,937 | 10/1950 | Palm | 281/5 |
| 3,753,558 | 8/1973 | Sheroff et al. | 270/67 |
| 4,502,711 | 3/1985 | Muth | 281/5 |
| 4,917,405 | 4/1990 | Muth et al. | 281/5 |

FOREIGN PATENT DOCUMENTS

| | | |
|---|---|---|
| 2628361 | 9/1989 | France . |
| 0649841 | 2/1951 | United Kingdom ............... 281/5 |

*Primary Examiner*—Stephen P. Garbe
*Attorney, Agent, or Firm*—Herbert Dubno

[57] ABSTRACT

Foldable object such as information carrier, container or the like, having two wings (1, 2) which can be folded and unfolded about a swing line (3), whereby wing surfaces (4, 5) are provided which fold down between the wings during folding and fold out from between them when the wings are unfolded and the object consists mainly of a shape having projecting and recessed fold lines, so that by folding the wings (1, 2) the wing surfaces (4, 5) can be arranged between the wings and that after unfolding the wings the shape forms an essentially flat surface, the shape having two main fold lines (6, 7) whose intersection point (8) lies on the swing line (3) of the two wings and whereby starting from the each intersection point (25) of the longitudinal fold lines (23, 24) with the main fold lines (6, 7), perpendicularly to the longitudinal fold lines (23, 24), recessed fold lines (26) parallel to the transverse fold line (16) are provided, characterized in that respectively parallel to the longitudinal fold lines (23, 24) and parallel to said recessed fold lines (26), respective projecting fold lines (27, 28) are provided, which intersect each other at a right angle with the intersection point (29) in the main folding lines (6, 7).

4 Claims, 2 Drawing Sheets

FOLDABLE OBJECT SUCH AS INFORMATION CARRIER, CONTAINER AND THE LIKE

CROSS REFERENCE TO RELATED APPLICATION

This application is a national phase of PCT/AT92/00019 filed 13 Feb. 1992 and containing subject matter disclosed in Austrian national application A 1570/90 of 26 Jul. 1990.

1. Field of the Invention

The invention relates to a foldable object such as an information carrier, container and the like, having two wings which can be folded and unfolded about a swing line, whereby wing surfaces are provided which can be folded down between the wings when the wings are folded and can be unfolded when the wings are opened, and the object consists primarily of a shape having projecting and recessed fold lines, so that when the wings are folded the wing surfaces can be fitted between the wings and when the wings are unfolded, the folded sheet forms an essentially flat surface when opened. The folded sheet has two main fold lines perpendicular to each other whose intersection point is located in the swing line of the two wings and whereby, starting from each point of intersection of the longitudinal fold lines with the main fold lines and perpendicular to the longitudinal fold lines, recessed fold lines parallel to the transverse fold line are provided.

2. Background of the Invention

Foldable objects such as street maps are known and described in U.S. Pat. No. 4,210,347. After unfolding both wings it is necessary to unfold and pull part the wing surfaces folded between the wings. Prior to folding, the wing surfaces have first to be folded correctly and arranged between the wings.

From the French published application 2 628 361 a foldable object of the aforementioned kind has become known. This object has the disadvantage that, similarly to the one disclosed in U.S. Pat. No. 4,210,347, parts of the wing surfaces have to slide into each other when the object is folded, which in practice leads to difficulties during folding and unfolding. Especially during rapid folding the wing surfaces can be damaged.

OBJECT OFF THE INVENTION

It is an object of the present invention to arrange the wing surfaces so that during the folding of the wings they will automatically come to lie between the wings without engaging one another and damaging the wing surface.

SUMMARY OF THE INVENTION

The present invention is characterized by the fact that parallel to the longitudinal fold lines and parallel to the mentioned recessed fold lines, respective projecting fold lines are provided, which intersect each other at right angles at an intersection point located on the main fold line.

According to further features of the invention the folded sheet is characterized by the fact that projecting fold lines arranged parallel to longitudinal fold lines and the segment of the transverse fold lines are arranged so that in the folded state of the foldable object the highest they can reach is up to the median longitudinal line.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
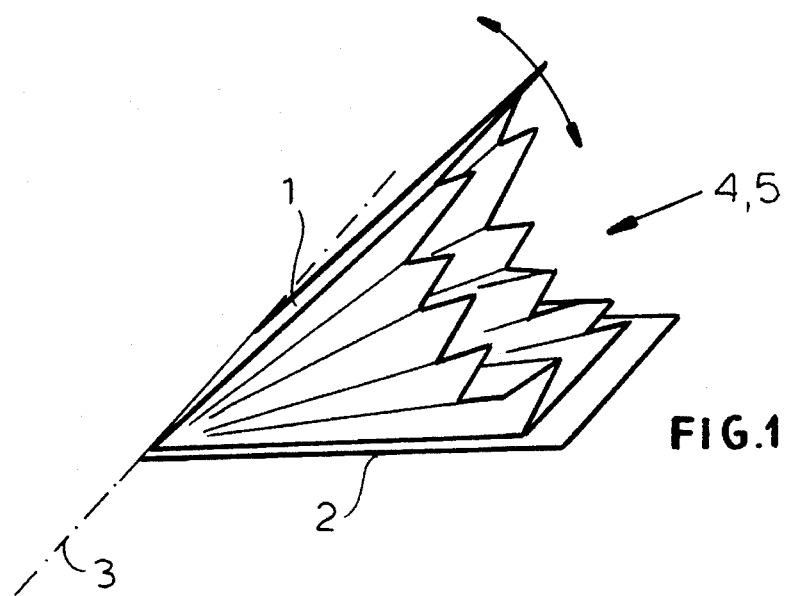
FIG. 1 is a diagrammatic perspective view which shows schematically the object of the invention in a slightly unfolded state.

According to FIG. 1, the object has two wings 1, 2 which can be folded about swing or pivot line 3, as indicated by arrows. The wing surfaces 4, 5 lie between the two wings, when the object is folded.

Figure 2:
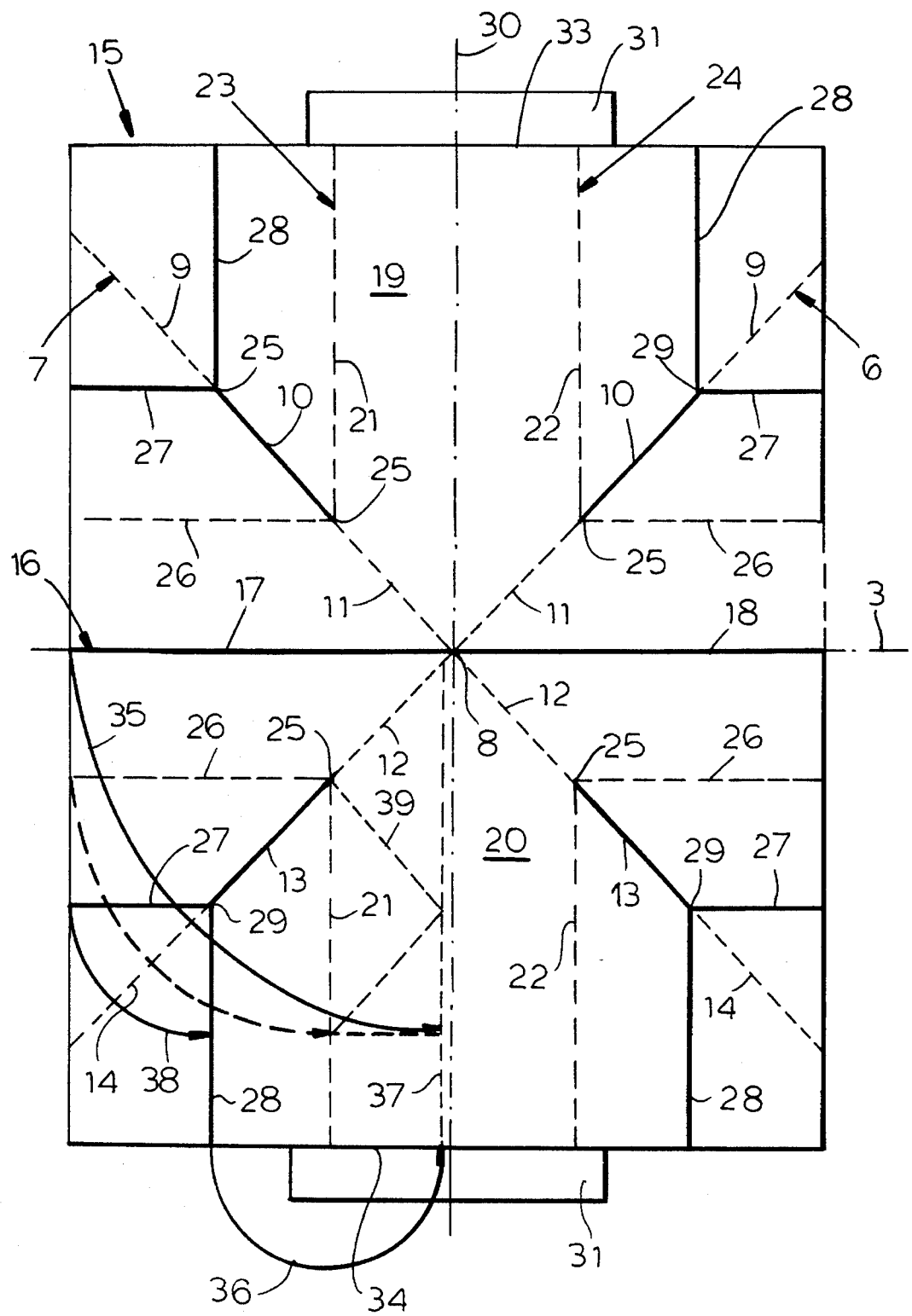
FIG. 2 is a diagrammatic plan view of the shape.

FIG. 2 shows the paper sheet or a corresponding foil material and the fold lines arranged thereon. Projecting fold lines are shown in solid lines and form projecting edges during folding. Recessed fold lines are shown in broken lines.

Figure 3:
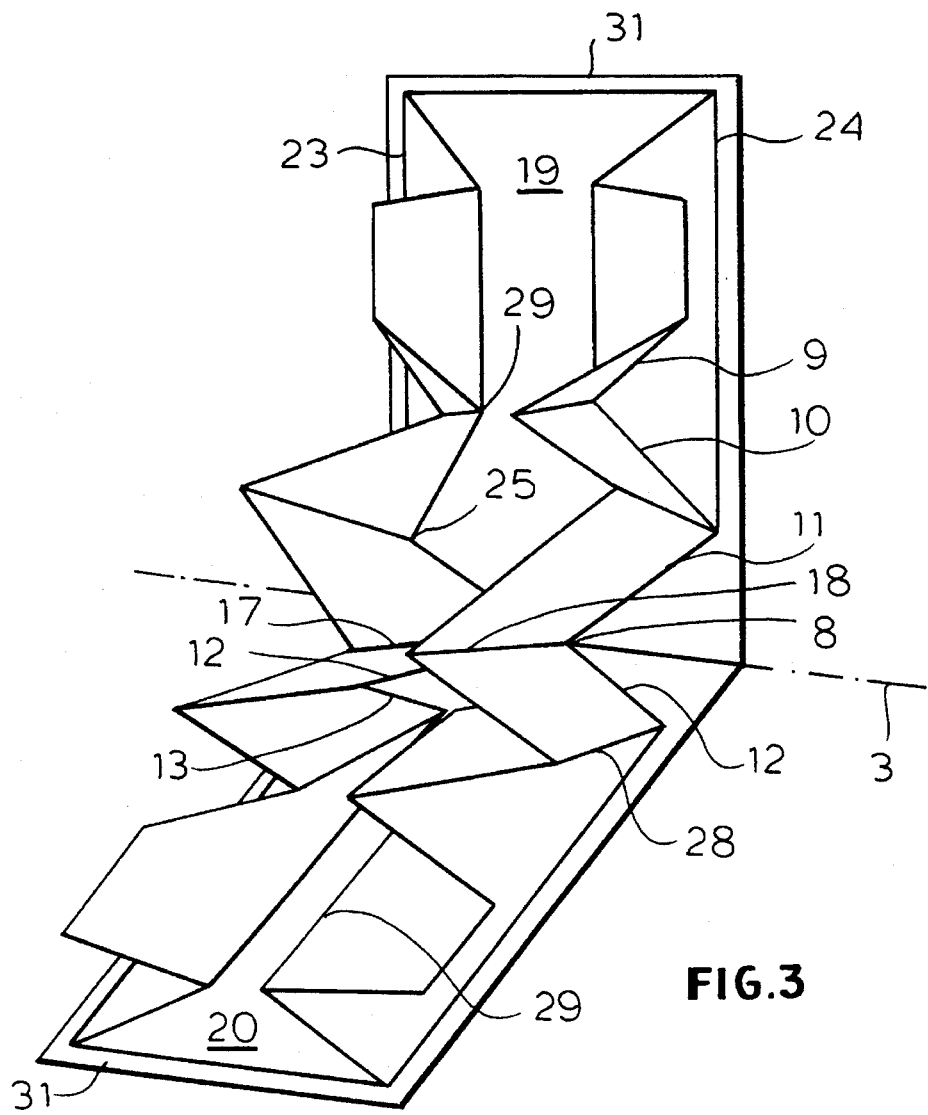
FIG. 3 is a perspective view of the partially folded object.

On the backside (underside of the shape) there are stiffening sheets 31 not shown here in detail, but which can be seen much clearer in FIG. 3.

The folded sheet 15, which can be printed, has two basically diagonal main fold lines 6,7 which are perpendicular to each other. The intersection point 8 of the two main fold lines lies in the swing or hinge line 3 of the two wings 1, 2. The fold line segments 11, 12 and 9, 14 are recessed, while the fold line segments 10, 13 are projecting. Further through the intersection point 8 runs a transverse fold line 16 formed by two projecting fold line segments 17, 18.

Further two longitudinal fold lines 23, 24 are provided, the left longitudinal fold line 23 consisting of two fold line segments 21 and the right longitudinal fold line 24 consisting of two fold line segments 22. Defined by the respective fold line segments 11, 21, 22 and the edges 33 or 34, of the paper sheet base surfaces 19, 20 are formed which basically constitute the wings 1, 2 and are connected, particularly glued, to stiffening sheets 31. The two base surfaces 19, 20 meet each other at the intersection point 8.

From the intersection points 25 of the longitudinal fold lines 23, 24 with the main fold lines 6, 7, perpendicularly with respect to the longitudinal fold lines 23 24, recessed fold lines 26 parallel to the transverse fold line 16 are provided. Further, parallel to the aforementioned fold lines 21 and 26, projecting fold lines 27, 28 are arranged so that they are offset towards the corners of the shape, whereby these fold lines intersect each other in the intersection point 29 on the main fold lines 6, 7.

When the object is folded, the base surface 19 is folded down about the swing line 3. Thereby the fold line segment 17 performs a motion according to arrow 35 and the fold line segment 28 is moved according to arrow 36. In the folded state of the object, the projecting edge formed by the fold line segments 16 and 28 assume a position as indicated with 37 in broken lines. According to arrow 38, the fold line segment 27 comes to lie over the fold line segment 28 and thereby also assumes the position indicated in broken lines by 37. When the object is folded, the fold line segment 13 (and by analogy the fold line segment 10) of the main fold lines 6, 7 assumes the position indicated by the broken line 39. The various positions of the projecting fold line segments are shown only in the lower left corner of FIG. 2.

Analogous conditions exist also at the other three corners of the shape.

FIG. 3 shows the object according to FIG. 2 in semi-folded state, whereby also the wings 1, 2 which are formed by the base surfaces 19, 20 and the stiffening surfaces 31, are at an angle of approximately 90 degrees with respect to each other. Similar parts show similar reference numerals, so that the figure is self-explanatory.

I claim:

1. A foldable object comprising a folded sheet having two wings foldable and unfoldable about a hinge line whereby wing surfaces are provided which during folding of the wings can be folded down between the wings and during the unfolding of the wings can be unfolded from between the wings, the folded sheet having projecting and recessed fold lines, so that upon folding of the wings the wing surfaces are arranged between the wings and that after the unfolding of the wings sheet forms an essentially flat surface, the folded sheet having two main diagonal fold lines perpendicular to each other with an intersection point lying in the hinge line of the two wings and transverse fold line segments along the hinge line, said sheet further having a plurality of longitudinal fold lines on opposite sides of a longitudinal median line perpendicular to the hinge line, the wing surfaces on opposite sides of the longitudinal median line terminating on the respective sides thereof in a fully folded state of the sheet, said longitudinal fold lines having intersection points with the main fold lines, said sheet further having respective recessed fold lines perpendicular to the longitudinal fold lines, and parallel to the hinge line, said sheet further having respective projecting fold lines parallel to the longitudinal fold lines and parallel to said recessed fold lines, said projecting fold lines intersecting each other at right angles with intersection points in the main fold lines.

2. The foldable object according to claim 1 wherein, when the object is folded, the projecting fold lines running parallel to the longitudinal fold lines and the transverse fold line segments are arranged so that the highest they can reach is up to the longitudinal median line.

3. The foldable object according to claim 1 wherein stiffening sheets are glued to said wings and the stiffening sheets are interconnected by a fold line which is arranged along the hinge line.

4. The folding objects according to claim 1, said sheet is of paper and is printed.

* * * * *